No. 760,741. PATENTED MAY 24, 1904.
W. L. KANN & J. H. CURRY.
FASTENING FOR PLATE GLASS IN STORE FRONTS AND SHOW CASES.
APPLICATION FILED AUG. 17, 1903.
NO MODEL.
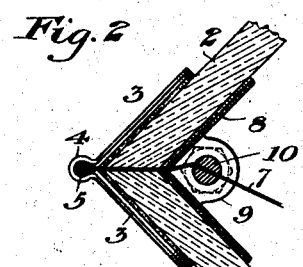
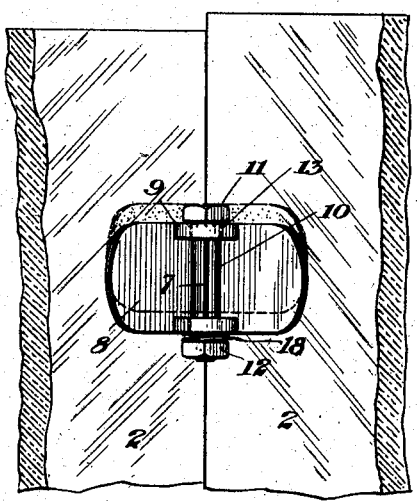
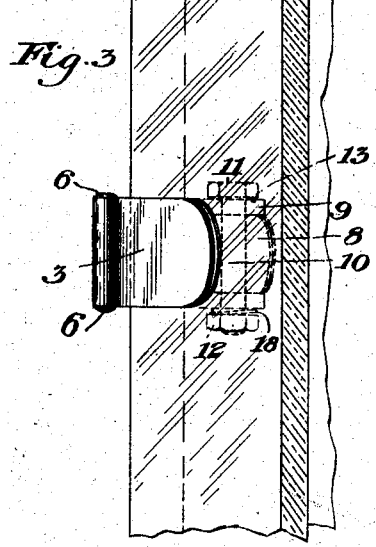
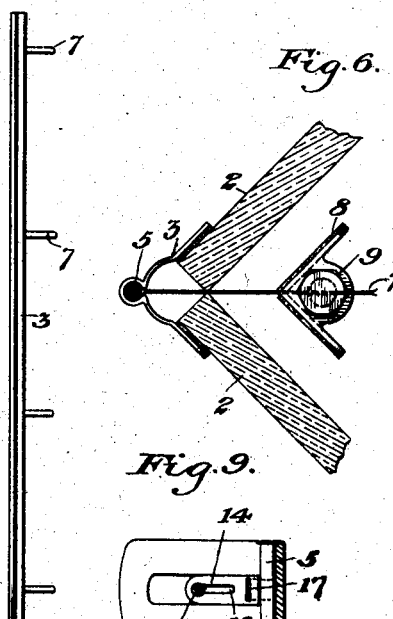
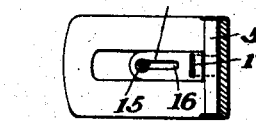
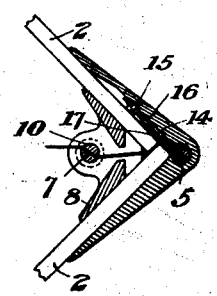
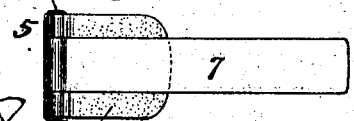
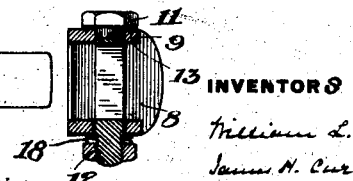
WITNESSES
INVENTORS No. 760,741. Patented May 24, 1904.

UNITED STATES PATENT OFFICE.

WILLIAM L. KANN, OF PITTSBURG, AND JAMES H. CURRY, OF WILKINSBURG, PENNSYLVANIA.

FASTENING FOR PLATE-GLASS IN STORE-FRONTS AND SHOW-CASES.

SPECIFICATION forming part of Letters Patent No. 760,741, dated May 24, 1904.

Application filed August 17, 1903. Serial No. 169,694. (No model.)

*To all whom it may concern:*

Be it known that we, WILLIAM L. KANN, of Pittsburg, and JAMES H. CURRY, of Wilkinsburg, in the county of Allegheny and State of Pennsylvania, have invented a certain new and useful Fastening for Glass Plates in Store-Fronts and Show-Cases, of which the following is a full, clear, and exact description, reference being had to the accompanying drawings, forming part of this specification, in which—

Figure 1 is an interior view of the meeting edges of two plates of glass, showing the inner member of our improved fastener for securing the plates to each other. Fig. 2 is a horizontal sectional view of the same. Fig. 3 is a side elevation of the fastener. Fig. 4 is a vertical sectional view of the outer member of the fastener, showing the strips for connecting it to the inner member. Fig. 5 is a vertical sectional view showing the securing-clip. Fig. 6 is a horizontal sectional view of a modification in which the outer member of the fastener is in the form of a continuous strip. Fig. 7 is a detached view of such continuous strip. Fig. 8 is a view of a modification, and Fig. 9 is a sectional view of the same.

Like symbols of reference indicate like parts in the several figures.

Our invention relates to an improvement in devices for securing plates of glass to each other, and it is especially adapted for use in show-windows and show-cases.

It consists in a fastener adapted to clamp the plates of glass at any desired angle to each other, and in such manner that they shall be firmly held, forming a perfect joint, and yet so as to permit of movement of one or the other of them, due to settling or expansion or other cause, without injury to either.

Our improved fastener is also adapted to be used in fastening glass plates without the necessity of cutting holes in the glass.

We will now describe our invention so that others skilled in the art may manufacture and use the same.

In the drawings, 2 2 represent the two plates of glass which it is desired to connect one with the other. In the use of our fastener the meeting edges of the plates may be beveled, as shown in Fig. 2, or the plates may be united without the bevel, as shown in Figs. 6 and 8.

The fastener itself is composed of an outer corner-piece 3, formed of brass, aluminium, or other metal, the leaves of which extend from each other at the angle the two plates of glass are to occupy and have a connecting U-shaped portion 4, which serves as a keeper for the pintle 5, which pintle is provided with heads 6, which may be formed by flattening the ends of the pintle and which serve to prevent the escape of the pintle from the keeper. Embracing the pintle 5 is a strip 7, of metal, preferably very thin and flexible and of a width less than the length of the pintle, which is bent around the pintle and the two ends of which project through the space between the leaves of the corner-piece 3. The leaves of the inner corner-piece 8 may be substantially of the same shape and size as the outer corner-piece and preferably are made of the same material; but instead of having a keeper portion 4 they extend directly from each other at the angle the plates are to occupy, and at the apex of the V thus formed is a slot for the passage of the ends of the metal strip 7. At the upper and lower portions of the corner-piece 8, on the inner faces of the same and integral therewith or rigidly secured thereto, are two rings or collars 9 for the passage of the screw-bolt 10. This screw-bolt 10 is slotted for the passage of the ends of the metal strip 7 and is provided with a head 11 at one end and a securing-nut 12 at the other. Between the nut 12 and the lower collar 9 there is interposed a spring 18 for locking the nut 12 against movement. The outer or upper face of the upper collar 9 is provided with ratchet-teeth 13, against which the head 11 is adapted to bind to prevent rotation or turning of the bolt after being brought to a fastening position. The bolt 10, with its head 11 and nut 12, and the collars 9 form a clip adapted to secure the inner corner-piece 8 on the strip 7 and against the inner faces of the plates of glass.

In operation the meeting edges of the glass plates having been beveled, as shown in Fig. 2, the outer corner-pieces 3 are placed against the plates at their meeting edges, the thin metal strips extending between the edges of the plates. These strips are so thin as to pass between these edges without the necessity of leaving any noticeable space between the plates, or where it is desired to have strips of greater thickness the edges of the plate or plates may be filed away slightly at this point. If desired, and usually it is preferable, the corner-pieces 3 may be secured to the glass plates by means of layers of felt, cemented to the glass and to the corner-pieces by fish-glue or other suitable adhesive. A suitable number of corner-pieces 3 having been placed in position, the strips 7 extending to and beyond the inner faces of the glass plates, the inner corner-pieces 8 are passed over the strips and forced against the inner faces of the plates, and when in this position the nuts 12 are tightened and the inner corner-pieces are locked on the strips by turning the slotted bolts 10, which wraps the thin metal strips about the bolts and draws the corner-pieces 3 and 8 firmly against the glass, as shown in Fig. 2, thus holding the plates securely in the desired position.

As indicated in Fig. 4, the strip 7 preferably is of a width less than the length of the pintle 5 and extends around the same, so that there may be a vertical movement of the strip on the pintle, thus permitting either or both of the glass plates settling or expanding without breaking the glass.

In Figs. 6 and 7 we show a modification in which the outer corner-pieces 3 are formed in a continuous piece, having at intervals strips 7, extending from the continuous pintle 5. In such case it is not necessary to bevel the meeting edges of the glass, as the outer joint of the plates is covered by the continuous corner-piece.

In Fig. 8 we show another modification in which one of the leaves of the outer corner-piece is provided with an adjustable slide 14, which fits in a recess in the inner face of the leaf, being secured by the screw 15, passing through the slot 16, and it is provided with a slot 17, through which the strip 7 after making a band passes. By adjusting the slide 14 longitudinally on the face of the leaf the slot 17 may be brought closer to or farther from the pintle 15, according to the thickness of the glass, the purpose being to permit the edges of the sheets of glass to make a butt-joint, as shown in Fig. 9, the strip 7 passing from the leaf along the face of one plate of glass and between this face and the edge of the other sheet. The purpose of the slide 14 is to give a fixed stationary bend to the strip 7 and to keep this bend from pressing against the edge of the glass.

The advantages of our invention will be appreciated by those skilled in the art. One of the chief advantages is that it is not necessary to cut the glass, which not only weakens it, but forms a line of fracture in cases of unequal settling or separation of the glass. Our fastener is also very easily applied and is thoroughly efficient in securing the plates one to the other.

The corner-pieces 3 and 8 may be made to suit the angle in which it is intended that the plates shall extend, and they may be made of any size and strength desired, according to the size and thickness of the plates in connection with which they are to be used.

The flexible strips 7 allow for expansion and contraction of the glass and for settling or other movement thereof. By reason of their flexibility they may also be used where the edges of the plates are irregular.

We claim—

1. In a glass-plate fastener, the combination of inner and outer securing corner-pieces, a flexible strip adapted to extend between the plates of glass and from the outer corner-piece to the inner corner-piece, and a clip for securing the inner corner-piece to the strip.

2. In a glass-plate fastener, the combination of inner and outer securing corner-pieces, a flexible strip extending from the outer corner-piece through the inner corner-piece and adapted to pass between the plates of glass, and a clip for securing the inner corner-piece to said strip.

3. In a glass-plate fastener, the combination of inner and outer corner-pieces, a keeper formed in the outer corner-piece, a pintle adapted to fit in the keeper, a metal strip of less width than the length of the pintle, said strip embracing the pintle and extending through the inner corner-piece, and a clip for securing the inner corner-piece on the strip.

4. In a glass-plate fastener, the combination of inner and outer corner-pieces, a strip extending from the outer corner-piece through the inner corner-piece, and a clip consisting of a slotted bolt which is secured to the inner corner-piece and adapted to receive the strip.

5. In a glass-plate fastener, the combination of inner and outer corner-pieces, a strip extending from the outer corner-piece through the inner corner-piece, and a clip consisting of a slotted bolt secured to the inner corner-piece and adapted to receive the strip, said bolt being provided with a nut and a locking-head.

6. In a glass-plate fastener, the combination of inner and outer corner-pieces, a strip extending from the outer corner-piece to the inner corner-piece, a clip consisting of a slotted bolt secured to the inner corner-piece and adapted to receive the strip, said bolt being provided with a nut, and a locking-head, and a ratchet.

7. In a glass-plate fastener, the combination of inner and outer securing corner-pieces, a strip extending from the outer corner-piece to the inner corner-piece, a securing-clip, and an adjustable piece by means of which the point from which the strip projects from the outer corner-piece may be varied.

8. A clamp for glass plates, consisting of an outside fastening-plate, a flexible strip connected therewith and projecting inwardly between the meeting edges of the glass plates, an inside fastening-plate having a suitable opening for receiving said strip, and means upon the end of said strip for clamping the parts together.

9. The combination with two glass plates having smooth adjacent edges placed in position at an angle to each other and arranged apart but in close proximity to each other at their adjacent edges, of a corner-fastener comprising an outer corner-piece arranged at the outer sides of the said plates, an inner corner-piece arranged at the inner sides of said plates; and a flexible strip instrumental in connecting the said corner-pieces together and extending between the aforesaid edges, which strip is shiftable vertically between the said edges in the aforesaid position of the plates; and means for securing the corner-fastener in its operative position.

10. The combination with two glass plates placed in position at an angle to each other and arranged apart but in close proximity to each other at their adjacent edges, of a corner-fastener comprising an outer corner-piece arranged to bear against the outer sides of the said plates, a corner-piece arranged to bear against the inner sides of the said plates; and a flexible strip extending between the said corner-pieces, which strip comprises a member which extends between but is arranged wholly exteriorly of the said edges so as to render the corner-fastener adjustable vertically.

In testimony whereof we have hereunto set our hands.

WILLIAM L. KANN.
JAMES H. CURRY.

Witnesses:
GEO. B. BLEMING,
JAMES K. BAKEWELL.